United States Patent Office 3,732,159
Patented May 8, 1973

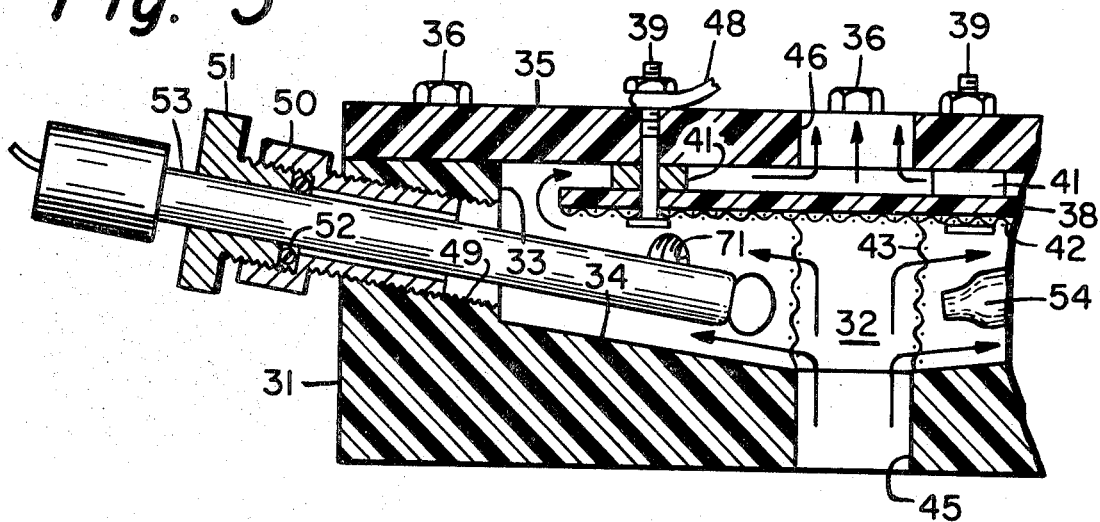
Fig. 3
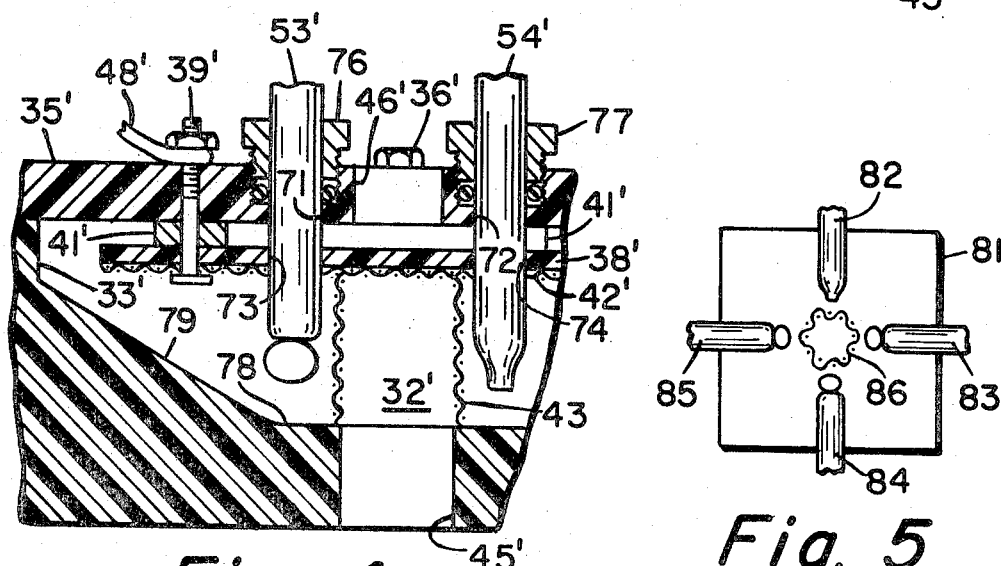
Fig. 4
Fig. 5
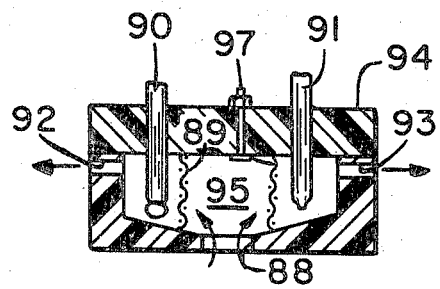
Fig. 6

3,732,159
FLOW-THROUGH CHAMBER FOR ANALYSIS OF CONTINUOUSLY FLOWING SAMPLE SOLUTION
David M. H. Platt, Hopkinton, Mass., assignor to Corning Glass Works, Corning, N.Y.
Filed Apr. 17, 1970, Ser. No. 29,467
Int. Cl. G01n 27/26, 27/28
U.S. Cl. 204—195 R
12 Claims

ABSTRACT OF THE DISCLOSURE

Disclosed is a flow-through sample analyzing chamber in which the electrodes are symmetrically disposed with respect to the fluid inlet and outlet passages, and the chamber construction in such that the flow of fluid therein is symmetrical. A conductive screen may be disposed in the fluid flow path to provide a uniform electrical field in the vicinity of the electrodes and to trap bubbles, thereby preventing the passage thereof over the electrodes.

BACKGROUND OF THE INVENTION

This invention relates to an improved flow-through sample analyzing chamber of the type wherein ion sensing and reference electrodes are positioned in a continuously flowing stream of sample containing solution.

Heretofore, a sample of solution to be analyzed has been disposed in an insulated bench top container in which there are immersed one or more ion sensing electrodes and a reference electrode. The magnitude of the potential difference between the conductors extending from an ion sensing electrode and the reference electrode, which is a function of the specific ion concentration of the body of test solution, is applied to a millivolt meter or electrometer which provides a readout in terms of concentration. In such a bench top study wherein the beaker is made of glass or plastic, the test solution is isolated from ground until the reference electrode is inserted therein. The reference electrode is usually grounded to the chassis of the electrometer, and current flows until the test solution in the beaker is also at ground potential. The specific ion electrode contains a standard solution in which is immersed a reference electrode. This electrode follows the potential of the external solution, differing by an amount dependent on the concentrations in the two solutions and the temperature.

If for some reason the test solution were not at the ground potential of the electrometer, the meter reading would indicate an offset from the true output of the specific ion electrode. Such would be the case if the conventional ion sensing end reference electrodes described above were mounted in a flow cell type sample analyzing chamber wherein inlet and outlet pipes connected thereto provided a continuous flow of test solution therethrough. Such an arrangement is shown in U.S. Pat. No. 2,705,220 entitled "Electro-Chemical Apparatus," issued Mar. 29, 1955 to E. P. Arthur. For example, assume that the flow cell is made of non-conductive material, that dissimilar metals are used as pipe connections upstream and downstream from the flow cell and that these conductive pipe connections are electrically connected to ground. These dissimilar metals form a battery, and there is an electric field established between them. The relative positions of the ion sensing and reference electrodes in the flow cell can cause them to be located at different potentials in this field. Even a true differential electrometer could not provide a reading of the actual ion sensing electrode potential. As the conductivity of the solution or the oxidation state of the metals change, the electrometer readings would also change. Such distortion would occur regardless of where the dissimilar metals are located. For example, one might be located in the drain and the other in the water supply. As long as there is a continuous path of conductive solution from one to the other, a potential gradient exists.

The problem discussed hereinabove has been long recognized and at least one solution has been heretofore proposed. U.S. Pat. No. 2,108,294 entitled "Method and Apparatus for Measuring Ion Concentration," issued Feb. 15, 1938 to E. D. Doyle et al. discloses an apparatus which avoids potential effects unrelated to the ion-concentration of the solution. The electrodes of the ion-concentration cell are isolated from ground, and when the solution flows through a grounded conduit, it is delivered to, and discharged from the ion-concentration cell in streams which are broken up into drops. The apparatus of this patent avoids the detrimental potential effects described above by causing the solution to flow in drops so that there is no continuous electrical connection between metals which could generate an electrical potential. However, the very means whereby this apparatus overcomes undesirable potential effects also introduces a disadvantage which is untenable in many analytical systems, i.e., the rate flow of test solution through the test cell is so low as to be completely unacceptable.

SUMMARY OF THE INVENTION

U.S. Pat. No. 3,649,504, entitled "System for Controlling the Electrical Field in a Fluid Analyzing Chamber," filed on even date herewith, discloses a system for controlling the electrical field in a sample analyzing chamber. Such a system is particularly useful in a flow-through system wherein extraneous electrical fields are encountered within the sample analyzing chamber, since it includes means for driving the reference potential electrode and the test solution in the vicinity of the active portions of all electrodes to a predetermined reference potential. The present invention relates to a type of sample analyzing chamber that is particularly suitable for use with the above-described system.

It is an object of the present invention to provide a sample analyzing chamber having improved means for establishing a uniform electric field in the vicinity of the active portions of all electrodes disposed therein.

Another object of the present invention is to provide a sample analyzing chamber having a symmetrical flow pattern.

A further object of the present invention is to provide a sample analyzing chamber for accommodating a large number of ion sensing electrodes.

Briefly, the flow-through chamber of this invention comprises a sample chamber for containing a quantity of sample solution, a plurality of electrodes being disposed in the chamber. Fluid inlet means provides the chamber with a source of sample fluid and fluid outlet means is so disposed in the chamber with respect to the inlet means that the sample solution flows in substantially equal length paths at substantially equal velocities from the inlet means past the electrodes to the outlet means.

BRIEF DESCRIPTION OF THE DRAWINGS

FIG. 3 is a partial, enlarged cross-sectional view of the embodiment of FIG. 2.

FIG. 4 is a cross-sectional view of a modification of the embodiment shown in FIG. 3.

FIG. 5 shows another embodiment of the present invention having a square baffle plate.

FIG. 6 is another embodiment of the present invention having a plurality of fluid outlet passages.

DETAILED DESCRIPTION

Figure 1:
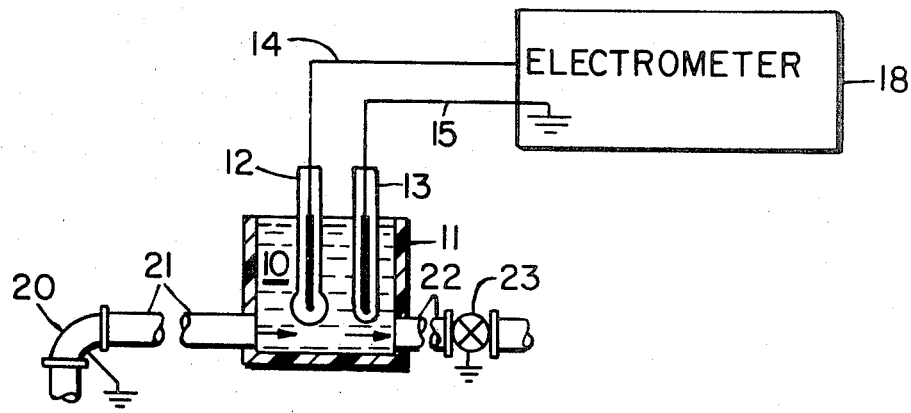
FIG. 1 shows a cross-sectional view of a prior art flow-through sample analyzing chamber.

FIG. 1 illustrates an extreme case which may be encountered when a flow-through sample analyzing chamber is connected to a piping system which provides and disposes of a continuously flowing sample solution. Non-conductive container 11 contains a solution in which are disposed a conventional ion sensing electrode 12 and a reference electrode 13. The electrodes 12 and 13 are respectively connected by conductors 14 and 15 to an electrometer 18 or other utilization means such as a process control system, conductor 15 being connected to the electrometer ground terminal. The potential difference appearing between conductors 14 and 15 is a function of the specific ion concentration of the solution 10, this potential difference being used to actuate the electrometer.

To illustrate the disadvantages of the prior art analyzing chamber illustrated in FIG. 1, consider the following specific example. A galvanized iron elbow 20 is located upstream of the container 11 and is connected thereto by a pipe 21, and a brass gate valve 23 is located downstream from the container 11 and is connected thereto by a pipe 22. Pipes 21 and 22 may be either conductive or non-conductive. Both the elbow 20 and the gate valve 23 are electrically connected to ground. The galvanized iron elbow 20 and brass gate valve 23 constitute a battery, and an electric field established between the zinc and brass may vary up to 1.5 volts away from ground.

The specific ion and reference electrodes 12 and 13, respectively, are at different potentials in this field due to their relative positions in the container 11. Even a true differential electrometer could not provide a reading of the actual specific ion electrode potential. As the oxidation states of the metals change, the extraneous potentials and therefore the electrometer reading also change. The electrometer reading may also be erroneously changed by a change in the distribution of electrical potential whenever the conductivity of the test solution changes.

The above-noted disadvantages are overcome by the system disclosed in the aforementioned Pat. No. 3,649,504 wherein the voltage sensed by the reference electrode is amplified and inverted by a control amplifier, the output of which is applied to conductive means disposed in the sample solution in the vicinity of the active portions of all electrodes. This system controls the electrical field in the sample analyzing chamber so that the signals obtained by the ion sensing electrodes, which are now referenced to ground, accurately indicate the ionic activity of the solution. The present invention relates to a preferred embodiment of a flow-through sample analyzing chamber for use in this system.

Figure 2:
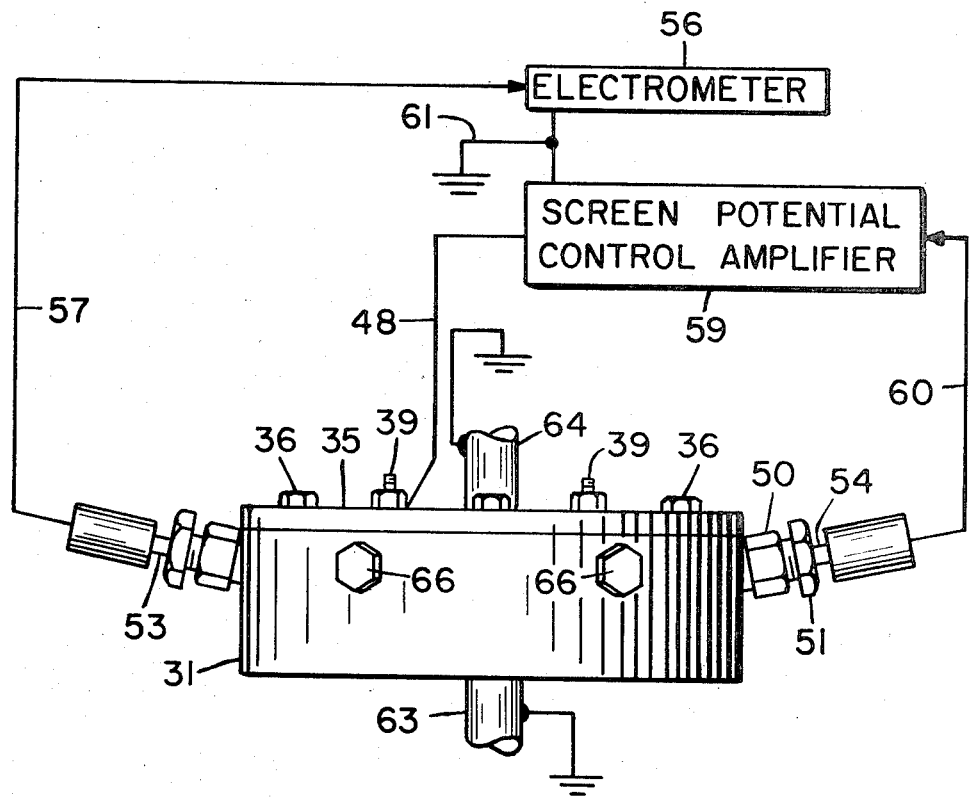
FIG. 2 is a side view of a preferred embodiment of a flow-through type sample analyzing chamber.

FIG. 2 is a side view of a sample analyzing chamber having two electrodes disposed therein, and FIG. 3 is an enlarged cross-sectional view of a portion of the chamber of FIG. 2. For the sake of simplicity, electrodes are not shown in all six of the electrode receiving holes. The sample analyzing chamber comprises a disc-shaped housing 31 having a cavity 32 therein which is defined by sidewall 33, floor 34 and a portion of the inner surface of cover 35 which may be secured to housing 31 by a plurality of bolts 36. A disc-shaped baffle plate 38 is secured to cover 35 by a plurality of bolts 39 and is spaced from the cover by washers 41. A conductive screen 42 is disposed adjacent the bottom surface of disc 38 and may be secured thereto by the bolts 39. A tubular screen 43 may be axially disposed within cavity 32 and may extend from the disc-shaped screen 42 to floor 34. Sample fluid enters a hole 45 which is axially disposed within housing 31 and flows through tubular screen 43, around baffle 38 and from hole 46 which is axially disposed in cover 35, as indicated by arrows. Sample fluid could also flow in a direction opposite the arrows as long as means are provided in the drain piping to maintain the sample fluid at a level sufficient to contact screens 42 and 43 and the active portions of the electrodes. An electrical connection is made to screens 42 and 43 by securing a conductor 48 to one of the bolts 39.

In the embodiment shown, up to six electrodes may be mounted through holes 49 in the vertical sides of housing 31. An outer tube nut 50 is disposed in hole 49, and an inner tube nut 51, having the correct inside diameter to receive an electrode, screws into a threaded opening in tube nut 50. O-ring 52, which is disposed between the end of tube nut 50 and a shoulder in tube nut 50, seals its associated electrode 53 into the sample chamber. As shown in FIG. 3, specific ion electrode 53 and reference electrode 54 are substantially equidistant from tubular screen 43 and disc-shaped screen 42.

The electrodes 53 and 54 are sloped slightly downwardly to insure proper location of the internal electrolyte. It has been found that the electrodes are sufficiently sloped when both the floor 34 and holes 49 slope toward the center of cavity 32 at an angle of 8° to the horizontal.

As described in detail in the aforementioned Pat. No. 3,649,504, ion sensing electrode 53 is coupled to an electrometer 56 by a conductor 57, and reference electrode 54 is connected to a screen potential control amplifier 59 by a conductor 60. Both the electrometer 56 and amplifier 59 by a conductor 60. Both the electrometer 56 and amplifier 59 have a common ground connection 61. Amplifier 56 has a high input impedance and performs the following function. It senses the deviation of the input voltage between conductor 60 and ground connection 61 and amplifies and inverts this signal. Preferably, the amplifier output signal is integrated so that the output may float with respect to the input volage level. A parallel R-C filter connected to the output of the amplifier insures that the amplifier output does not respond too rapidly to changes at the input thereof. The overall function of the amplifier is to provide an area adjacent the tips of all electrodes of zero potential relative to the reference potential of the electrometer. The amplifier output is coupled by conductor 48 to screen 42. The amplifier output must provide current to screen 42 to eliminate the potential deviation between conductors 60 and 61.

Conductive pipes 63 and 64 which are threaded, glued or otherwise affixed in holes 45 and 46, respectively, and all electrical and electronic grounds in the system, including the common electrical ground connection of electrometer 56 and amplifier 59, may be referenced to these pipes. Although such a common ground connection is preferred, it is not a necessity.

Housing 31 and lid 35 are preferably made from thermal plastics such as P.V.C. polyethylene, polypropylene, fluoroplastics such as polytetrafluoroethylene or other plastics such as filled or unfilled epoxy resin, acrylics, phenolics or the like. Other non-conductive materials such as glass, ceramics or the like could also be used. Tube nuts 50 and 51 may be made from metallic or non-metallic material. These tube nuts could be eliminated by using electrodes which are designed to screw or plug directly into holes 49. When using less electrodes than the number of holes 49, the unused holes must be sealed by a member 66 which may screw or plug into the unused hole. Each ion sensing electrode is connected to its respective electrometer or other utilization device, but only one amplifier 59 is required.

FIG. 4 shows an alternative embodiment in which the electrodes project through holes in the cover of the sample analyzing chamber rather than through holes in the sidewalls thereof. In this embodiment, components similar to those illustrated in FIGS. 2 and 3 are indicated by primed reference numerals. Electrodes 53' and 54' extend through holes 71 and 72 in cover 35' and through holes 73 and 74 in baffle plate 38' and screen 42' and into the cavity 32'. These electrodes are sealed to the cover 35' by tube nuts 76 and 77 which compress O-rings against the electrodes and against shoulders within holes 71 and 72. The floor of cavity 32' is defined by a horizontal section 78 and a beveled section 79.

Electrodes 53' and 54' are symmetrically disposed with respect to the fluid inlet and outlet passages 45' and 46'. Fluid enters cavity 32' in the center thereof and flows radially outward and into the annulus defined by the circumference of disc-shaped baffle plate 38' and cover 35'. Bubbles contained in the sample fluid flowing into cavity 32' are entrapped by screen 43' and float to the top thereof where they can thereafter travel across the screen 42' and into the aforementioned annulus on their way to the outlet passage 46'. The accuracy of the potential developed by the electrodes is enhanced by the fact that such bubbles are not permitted to flow to the electrodes where they may become attached and reduce the amount of active surface area.

A symmetrical flow of sample fluid is obtained when the fluid flow paths between the inlet and outlet passages past each of the electrodes in the chamber are equal. Such a symmetrical flow is achieved by the embodiments of FIGS. 2, 3 and 4 due to the radial flow of sample solution from the axis of cavity 32 past all of the electrodes therein to the annulus defined by plate 38 and cover 35. Symmetrical flow is desirable for the following reasons. The concentration of the sample solution can change very rapidly. If the electrodes were disposed in the sample analyzing chamber at unequal distances from the incoming sample solution, the electrical signals developed by the ion sensing electrodes would not be correlated, i.e., they would not be in proper phase. This condition is especially detrimental when the signal from one electrode is used to modify the signal from another electrode. This disadvantage is overcome by the symmetrical embodiments shown in FIGS. 2, 3 and 4.

Cavity 32 and/or baffle plate 38 may take on other geometrical shapes than the circular shape disclosed. For example, FIG. 5 shows a schematic illustration wherein a square baffle plate 81 is used in conjunction with a cavity wherein a reference electrode 82 and ion sensitive electrodes 83, 84 and 85 are disposed. As described in connection with FIGS. 2, 3 and 4, a tubular screen 86 is axially disposed within the cavity adjacent the inlet passage. Sample solution therefore flows into and through tubular screen 86 and thereafter flows past electrodes 82-85 and into a square-shaped slot defined by baffle plate 81 and a cover plate adjacent thereto.

Modifications may be made to the preferred embodiments described herein without departing from the scope of this invention. For example, the baffle plate may consist of an n-sided polygon in a sample analyzing chamber wherein n equally spaced electrodes are disposed. Also, instead of the sample fluid flowing over a baffle plate and through an exit passage, it could flow from separate exit passages radially disposed with respect to each of the electrodes as ilustrated in the cross-sectional view of FIG. 6. Sample fluid enters passage 88 and flows through conductive screen 89, past electrodes 90 and 91, and out of the passages 92 and 93, respectively. Passages 92 and 93 may be connected to a drain system which conveys the fluid emanating therefrom to a height above that of the lower surface of cover 94 so that the entire cavity 95 is filled with sample solution. Bolt 97 may be used to provide a conductive connection to screen 89. Since best results are obtained when the fluid flows past the electrodes at substantially constant velocities, passages 92 and 93 should be the same diameter.

Although the preferred embodiments of the present invention have been described as including a discrete conductive member such as a screen immersed in the sample fluid adjacent the active portions of the electrodes, such a conductive member could be eliminated if the entire sample analyzing chamber were made of conductive material. Such a conductive chamber must be insulated by connecting it to non-conductive pipes and disposing it on non-conductive supports. To avoid differential corrosion effects in such an embodiment, all conductive parts of the chamber should be made of the same metal, and that metal should not be easily corrodible. Since the avoidance of differential corrosion effects is difficult to achieve, this modification is not preferred. The preferred equipotential surface is a screen which corrodes more uniformly than an all metal analyzing chamber and which therefore gives a more uniform electrical field within the chamber. A screen is also preferred over a solid metal plate since a screen provides a greater area of contact with the solution, and sample solution can flow through it. A screen may corrode to the extent that portions thereof separate, but it can easily be replaced. Although a screen is preferred, a screen such as the disc-shaped screen 42 of FIG. 3 could be replaced by a solid sheet of metal.

I claim:

1. A flow-through chamber for analysis of a continuous flow of sample solution comprising
   a sample chamber for containing a volume of said sample solution, said sample chamber comprising a disc-shaped housing having a cavity therein,
   a reference electrode and at least one ion sensing electrode in said chamber,
   fluid inlet means for providing said chamber with a source of sample solution, said inlet means comprising an opening on the axis of said housing, and
   fluid outlet means so disposed in said chamber with respect to said fluid inlet means that the distances between said fluid inlet means and the active portions of said electrodes are equal and said sample solution flows in substantially equal length paths and substantially equal velocities from said inlet means past said electrodes to said outlet means, said outlet means comprising a plurality of openings disposed in the sidewalls of said housing, whereby said sample solution flows radially through said chamber.

2. A flow-through chamber for analysis of a continuous flow of sample solution comprising:
   a sample chamber for containing a volume of said sample solution,
   a reference electrode and at least one ion sensing electrode in said chamber,
   fluid inlet means for providing said chamber with a source of sample solution,
   fluid outlet means so disposed in said chamber with respect to said fluid inlet means that the distances between said fluid inlet means and the active portions of said electrodes are equal and said sample solution flows in substantially equal length paths and substantially equal velocities from said inlet means past said electrodes to said outlet means, and
   conductive means disposed in said chamber in contact with a substantial portion of said fluid in the vicinity of the active portions of said electrodes, and means for applying a voltage to said conductive means.

3. A flow-through chamber in accordance with claim 2 wherein said conductive means is a tubular member, said electrodes being equally spaced around said tubular member, the ends of said electrodes being disposed substantially equidistant from said conductive member.

4. A flow-through chamber in accordance with claim 3 wherein said conductive member is a screen.

5. A flow-through chamber in accordance with claim 3 further comprising a planar conductive member in contact with said tubular screen.

6. A flow-through chamber in accordance with claim 2 wherein said chamber is made of conductive material, said conductive means being that portion of the inside surface of said chamber that is in contact with said fluid.

7. A flow-through chamber for analysis of a continuous flow of sample solution comprising:
   a disc-shaped housing having a circular cavity therein,
   a plurality of electrodes, the active portions thereof being symmetrically disposed in said cavity with respect to the axis thereof, fluid inlet and outlet means disposed at the top and bottom of said cavity on the axis thereof, and a baffle plate so disposed on the axis of said cavity that sample solution must flow radially in said cavity around said plate to reach said outlet means.

8. A flow-through chamber in accordance with claim 7 further including a tubular screen adjacent said inlet means in intercepting relationship with respect to fluid flowing into said chamber.

9. A flow-through chamber in accordance with claim 8 further comprising means to make an electrical connection to said tubular screen.

10. A flow-through chamber in accordance with claim 9 further comprising a planar conductive member in contact with said tubular screen, said planar member being symmetrically disposed in said cavity with respect to said electrodes.

11. A flow-through chamber in accordance with claim 10 wherein said planar member is a screen.

12. A flow-through chamber in accordance with claim 11 further comprising means connected to said conductive means for providing said tubular and planar screens with a potential of the proper magnitude and polarity to generate a reference electrical field in the vicinity of said electrodes.

References Cited

UNITED STATES PATENTS

| | | | |
|---|---|---|---|
| 2,782,151 | 2/1957 | Suthard | 204—1 T |
| 907,140 | 12/1908 | Frei | 204—275 |
| 3,365,659 | 1/1968 | Breuer | 324—30 |
| 3,501,392 | 3/1970 | Ayers | 204—195 |
| 3,573,178 | 3/1971 | Blackmar | 204—275 X |
| 1,882,316 | 10/1932 | Cleary | 324—30 X |
| 3,234,562 | 2/1966 | Bell et al. | 204—1 T |

GERALD L. KAPLAN, Primary Examiner

U.S. Cl. X.R.

204—275; 324—29, 30 R